United States Patent [19]

Iten et al.

[11] 3,743,420

[45] July 3, 1973

[54] METHOD AND APPARATUS FOR MEASURING THE PERIOD OF ELECTRICAL SIGNALS

[75] Inventors: Paul Iten, Oberrohrdorf; Jiri Mastner, Niederrohrdorf, both of Switzerland

[73] Assignee: Aktiengesellschaft Brown, Boveri & Cie, Baden, Switzerland

[22] Filed: Sept. 23, 1971

[21] Appl. No.: 183,100

[30] Foreign Application Priority Data
Sept. 25, 1970 Switzerland.................... 14244/70

[52] U.S. Cl. ................................ 356/28, 324/78 R
[51] Int. Cl. ....................... G01p 3/36, G01r 23/02
[58] Field of Search .............. 324/78 R, 78 D, 79 R, 324/79 D; 328/165, 140; 356/28, 27; 343/8

[56] References Cited
UNITED STATES PATENTS
3,518,531   6/1970   Huggett et al. ................ 328/165 X
3,555,434   1/1971   Sheen ........................... 328/140 X Primary Examiner—Alfred E. Smith
Attorney—W. G. Fasse

[57] ABSTRACT

The present method and apparatus measures the cycle duration of electrical signals by deriving through logic circuit means a time marker signal and a control signal from said electrical signals. The time marker signal is produced when the electrical signal passes through zero and if the electrical signal amplitude has exceeded a predetermined level during the half period just prior to said zero passage. The time marker signal indicates the number of cycles which have exceeded that level. The control signal indicates the total duration of said signals which have exceeded said level. The cycle duration of the time marker signal may then, for example, be determined in a counter which is switched on and set back to zero by the control signal. Alternatively, it is possible to determine the duration of a number of input signal periods from the control signal with the aid of the time marker signal. The present method and apparatus are especially useful for increasing the spacial resolution of Laser-Doppler flow probes.

19 Claims, 7 Drawing Figures

METHOD AND APPARATUS FOR MEASURING THE PERIOD OF ELECTRICAL SIGNALS

BACKGROUND OF THE INVENTION

The present invention relates to a method and apparatus for measuring the cycle duration or frequency of electrical signals, which have statistically or randomly varying amplitudes but which must exceed a definite, adjustable level in order to be measured.

Such devices are used where it is required to determine the cycle duration of electrical signals with a high degree of accuracy although the useful signal amplitude fluctuates statistically. Such fluctuations may be due to the system itself or, for example, they may be produced by interference. Ascertaining the cycle duration or frequency with a high degree of accuracy is especially necessary in connection with Radar-Doppler systems.

A Laser-Doppler flow probe is for instance described in "IEEE Journal of Quantum Electronics," 1966, pps. 260-266. The light beam of a continuous wave laser is focused onto the region of a flow field which is to be investigated and in which there are scattering particles. The moving particles of the flow field impart to the scattered laser light a Doppler frequency shift which represents a measure for the velocity of the scattering particles. The unscattered beam and a scattered beam are both focused through mirrors onto a photo detector for measuring said frequency shift, whereby a mixed difference signal or heterodyne signal is produced at a low, and thus electronically processable frequency. The frequency of the heterodyne signal is within the range of kilocycles or megacycles depending on the flow velocity.

The above-mentioned article suggests the use of frequency analysing means for processing the heterodyne signal. However, frequency analysing means are usually of little use when the Doppler frequencies are subject to large fluctuations which in practice is usually the case. Besides, the measurement may be falsified by interfering or noise signals superimposed on the Doppler signal.

OBJECTS OF THE INVENTION

In view of the foregoing, it is the aim of the invention to achieve the following objects, singly or in combination:

to avoid the disadvantages of prior art period duration measuring means as mentioned above;
to provide a method and electronic circuit arrangement for measuring with a high degree of accuracy the cycle or period duration of electrical input signals which are subject to substantial frequency fluctuations and/or the amplitudes of which vary statistically or at random;
to ascertain with high accuracy the frequencies of devices employing the Doppler effect, for example Radar-Doppler frequencies;
to ascertain with high accuracy the Doppler frequencies even if disturbing frequencies or interfering frequencies are super-imposed on the Doppler frequencies;
to improve the spacial resolution of Laser-Doppler flow probes;
to evaluate Doppler signals for ascertaining their period or frequency be evaluating only those Doppler signals the amplitude of which exceeds a predetermined, adjustable level;
to provide a method for rapidly measuring constant frequencies;
to provide a method for rapidly analysing frequency fluctuations or variations;
to provide a method for analysing frequencies or period durations of electrical signals which may be practiced with digital as well as with analog circuit means; and
to rapidly ascertain the cycle duration of a single period and/or to ascertain mean values over a number of cycles.

SUMMARY OF THE INVENTION

According to the invention there is provided a process for ascertaining the cycle duration of electrical input signals having fluctuating amplitudes but exceeding a predetermined, adjustable level, wherein a time marker signal is derived from said input signals at the time when the input signal passes through zero and provided the input signal has exceeded said predetermined level in the half cycle just prior to said zero passage whereby the time marker signal indicates the number of input signal cycles having exceeded said predetermined level, and wherein a control signal is also derived from the input signal for indicating the total duration of the signal cycles of the input signal which have exceeded said level. The cycle duration is then ascertained by suitably combining the derived signals in a digital or in an analog manner.

According to a first modification of the method according to the invention the time marker signal is supplied to a cycle duration measuring device for determining its cycle duration and the control signal is supplied to an auxiliary or control input of a counter forming part of the cycle duration device whereby the control signal turns the counter on and sets it back to zero in response to its logical level.

According to another embodiment of the present method the mean period or cycle duration of a predetermined number of periods of the input signal is ascertained from the control signal with the aid of the time marker signal whereby a presetable counter is used for selecting said number of cycles or periods of the input signal.

The apparatus according to the invention for performing the present method comprises essentially circuit means, including logic circuit means for producing said time marker signals and further circuit means also including logic circuit means for deriving said control signals from the electric input signal.

According to a further embodiment of the invention the electrical input signals to be measured or analysed are produced by means of a laser beam and a Laser-Doppler flow probe whereby only those Doppler signals are evaluated for ascertaining their frequency or period duration whose signal amplitude exceeds a predetermined adjustable, signal level.

BRIEF FIGURE DESCRIPTION

In order that the invention may be clearly understood, it will now be described, by way of example, with reference to the accompanying drawings from which all details not necessary for the understanding of the invention have been omitted.

DETAILED DESCRIPTION OF EXAMPLE EMBODIMENTS

The present method will now be described with reference to the block diagram of FIG. 1. The structural details and the function will then be described.

The input signal $U_E$ is supplied to two comparators 1 and 2. The comparator 1 always changes its initial state when the input signal passes through zero. The comparator 2 changes its initial state when the input signal $U_E$ exceeds or drops below a definite adjustable level $U_0$. The output signals $U_1$ and $U_2$ of the comparators 1 and 2 respectively are supplied to corresponding inputs of a logic circuit arrangement 3. The details of the logic circuit blocks 3 are shown in FIG. 2.

Figure 4:
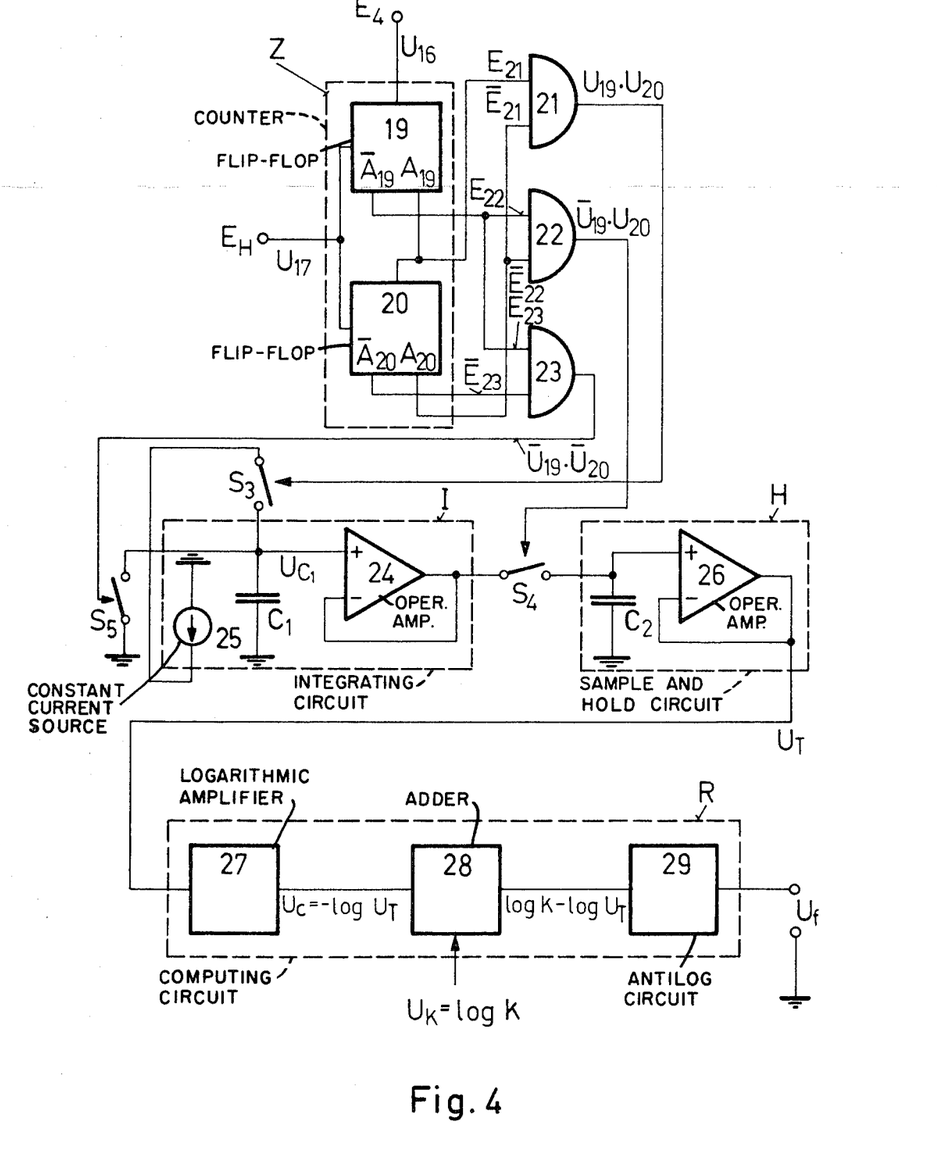
FIG. 4 is a circuit diagram for measuring frequencies which fluctuate as a function of time whereby the input terminals of the circuit according to FIG. 4 are connected to the output terminals of the circuit according to FIG. 2.

The logic circuit 3 selects the signals which have an amplitude exceeding the level $U_0$ to which the voltage source 6 may be adjusted. The output signal $U_{16}$ of the logic circuit 3 is supplied to an input $E_4$ of a period duration measuring device 4 which receives the signal $U_{16}$ as time marker signals which designate the passage of the input signal through zero. The logic circuit 3 provides a further output signal $U_{17}$ which is also derived from the input signals and constitutes a control signal supplied to the input $E_H$ of the cycle duration measuring device 4. The control signal $U_{17}$ enables the operation of the measuring device 4 when the amplitude exceeds said preadjusted level $U_0$ and it stops the operation of the device 4 when the input signal falls below said predetermined level. The details of the device 4 are illustrated in FIG. 4 whereby FIG. 4 also shows in more detail the computing device 5 which is connected with its input to the output of the measuring device 4 as shown in FIG. 1. The computing circuit arrangement 5 which converts the cycle duration representing signal $U_T$ to the frequency representing $U_f$ signal is mainly employed since in most cases it is not so much the cycle duration but rather the frequency of the input signal which is of interest.

Figure 2:
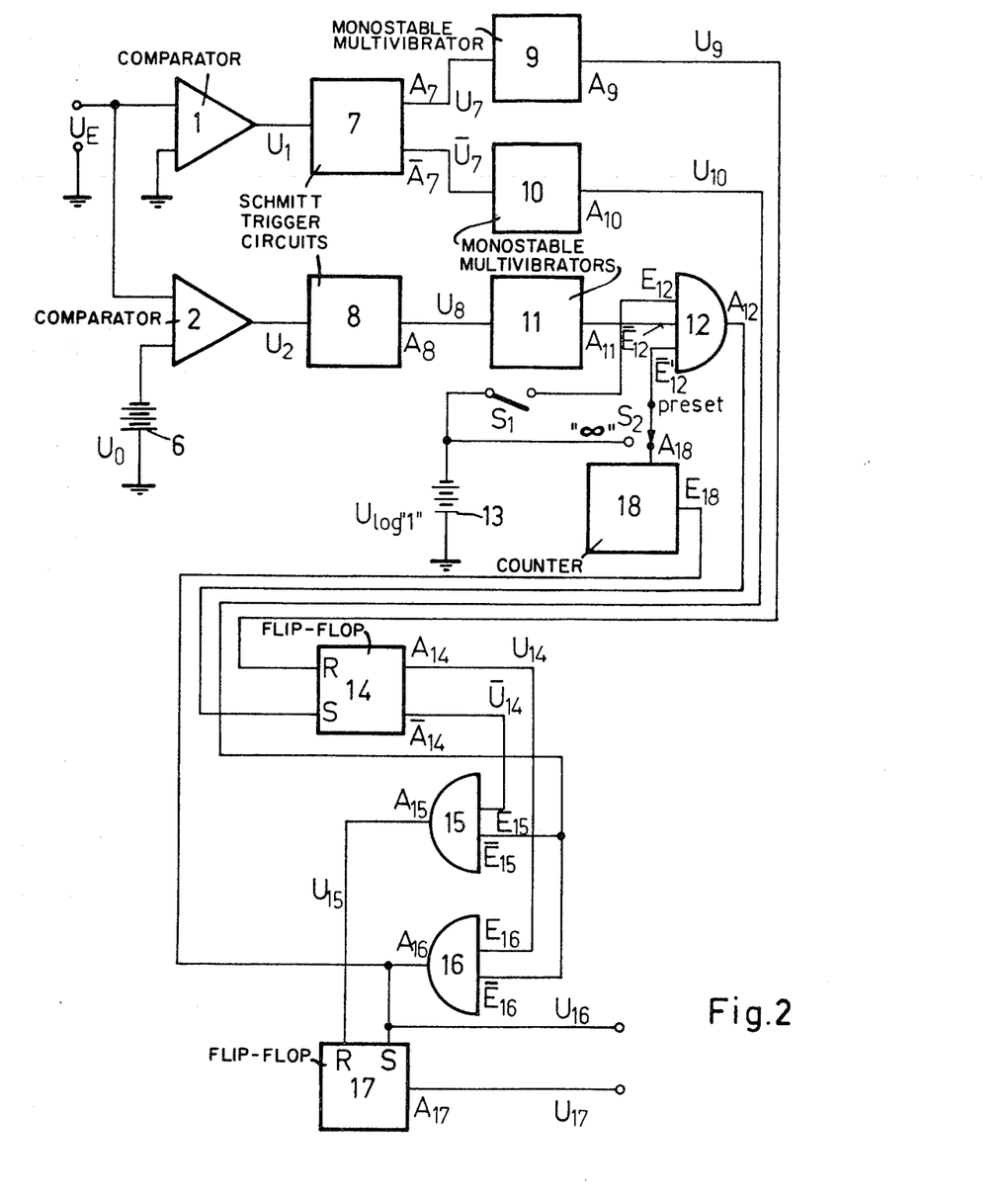
FIG. 2 illustrates in more detail the logic circuit arrangement comprising first and second comparing devices and constituting the input section of the measuring device according to FIG. 1.

Referring to FIG. 2, it should be noted that the circuit details of such circuit elements as the comparators 1 and 2, Schmitt trigger circuits 7 and 8, mono-stable multi-vibrators 9, 10, 11, flip-flop circuits 14 and 17 as well as AND-gates 12, 15 and 16 are well known as such and therefore are not shown in detail. The input signal $U_E$ is supplied directly to the inputs of the two comparator circuits 1 and 2. The comparison input of the comparator 1 is connected to ground potential. The comparison input of the comparator 2 is connected to a voltage source 6 which is preferably adjustable. The output of the comparator 1 is connected to the input of a first Schmitt trigger 7 while the output of the comparator 2 is connected to the input of a second Schmitt trigger 8. The Schmitt trigger 7 has two outputs $A_7$ and $\bar{A}_7$. The first output $A_7$ is connected to an input of a first monostable multi-vibrator 9. The second output $\bar{A}_7$ is connected to a second multi-vibrator 10. The Schmitt trigger 8 has but one output $A_8$ connected to a third multi-vibrator 11. The third monostable multivibrator has an output $A_{11}$ which is connected to a first input $\bar{E}_{12}$ of an AND-gate 12 which has also inputs $\bar{E}_{12}$ and $\bar{E}'_{12}$. The latter two inputs of the AND-gate 12 are connected through switches $S_1$ and $S_2$ respectively to a voltage source 13 which provides a voltage corresponding to the logic 1 of the system. The output $A_{12}$ of the AND-gate 12 and the output $A_9$ of the first mono-stable multivibrator 9 are connected to the set input S and to the reset input R respectively of a set and reset flip-flop 14. The output $A_{14}$ of the flip-flop 14 is connected to the first input $E_{16}$ of a first AND-gate 16. The output $\bar{A}_{14}$ of the flip-flop 14 is connected to the first input $E_{15}$ of a second AND-gate 15. The second inputs $\bar{E}_{15}$ and $\bar{E}_{16}$ of the AND-gates 15 and 16 are connected in parallel and to the output $A_{10}$ of the mono-stable multivibrator 10. The output $A_{15}$ of the second AND-gate 15 is connected to the reset input R of a second flip-flop 17. The output $A_{16}$ of the first AND-gate 16 is connected to the set input S of a set and reset flip-flop 17.

Referring further to FIG. 2, a presettable counter 18 is connected with its input $E_{18}$ to the output $A_{16}$ of the first AND-gate 16. The output $A_{18}$ of the counter 18 is connected through switching means $S_2$ to the input $\bar{E}'_{12}$ of the AND-gate 12. The switch $S_2$ connects thus the input $\bar{E}'_{12}$ either to the counter 18 or to the voltage source 13.

The circuit arrangement of FIG. 2 operates as follows having regard to the pulse-time diagram of FIG. 3. In order to clearly designate the circuit elements and their respective inputs and outputs, the following system of designation has been used. The input of any element N is designated with $E_N$. The output of any element N is designated with $A_N$. The negation of any input or output is designated by a dash above the respective letter E or A. The further negating input of the AND gate 12 is further designated with a prime, thus: $\bar{E}'_{12}$.

The explanation of the signal processing shall start at the beginning of the period or cycle $T_n$ of the input signal $U_E$. It is assumed that the switch $S_1$ is closed and the switch $S_2$ is in its infinite ($\infty$) position thus connecting the third input of the AND-gate 12 to the voltage source 13. The flip-flops 14 and 17 are in their rest position. The voltages $U_7$, $\bar{U}_7$, $U_9$, and $U_{10}$ are present regardless whether the input signal is larger or smaller than the preselected discriminator level $U_0$. However, these voltages are not present if the input signal is absent altogether. The first pulse $U_{11}$ is generated as soon as the input signal $U_E$ exceeds the threshold level $U_0$. Pulse $U_{11}$ passes the AND-gate 12 since now all input voltages are present at the three inputs of the AND-gate 12. Thus the flip-flop 14 is set and $U_{14}$ appears. Such setting is indicated in FIG. 3 by a dashed arrow from the pulse diagram $U_{11}$ to the pulse diagram $U_{14}$. The pulse $U_{10}$ is generated when the input signal $U_E$ passes again through zero. The pulse $U_{10}$ is applied to the second input $\bar{E}_{16}$ of the AND-gate 16 as well as to the second input $\bar{E}_{15}$ of the AND-gate 15. Further, at this time, the AND condition is met at the two inputs $E_{16}$ and $\bar{E}_{16}$ of the AND-gate 16 by the presence of the pulse $U_{14}$ and of the pulse $U_{10}$. Accordingly, the first time marker signal pulse $U_{16}$ appears at the output $A_{16}$ of the AND-gate 16. These time marker pulses $U_{16}$ appear at an output terminal of the circuit arrangement of FIG. 2. Simultaneously, the pulse $U_{16}$ sets the flip-flop 17.

Figure 3:
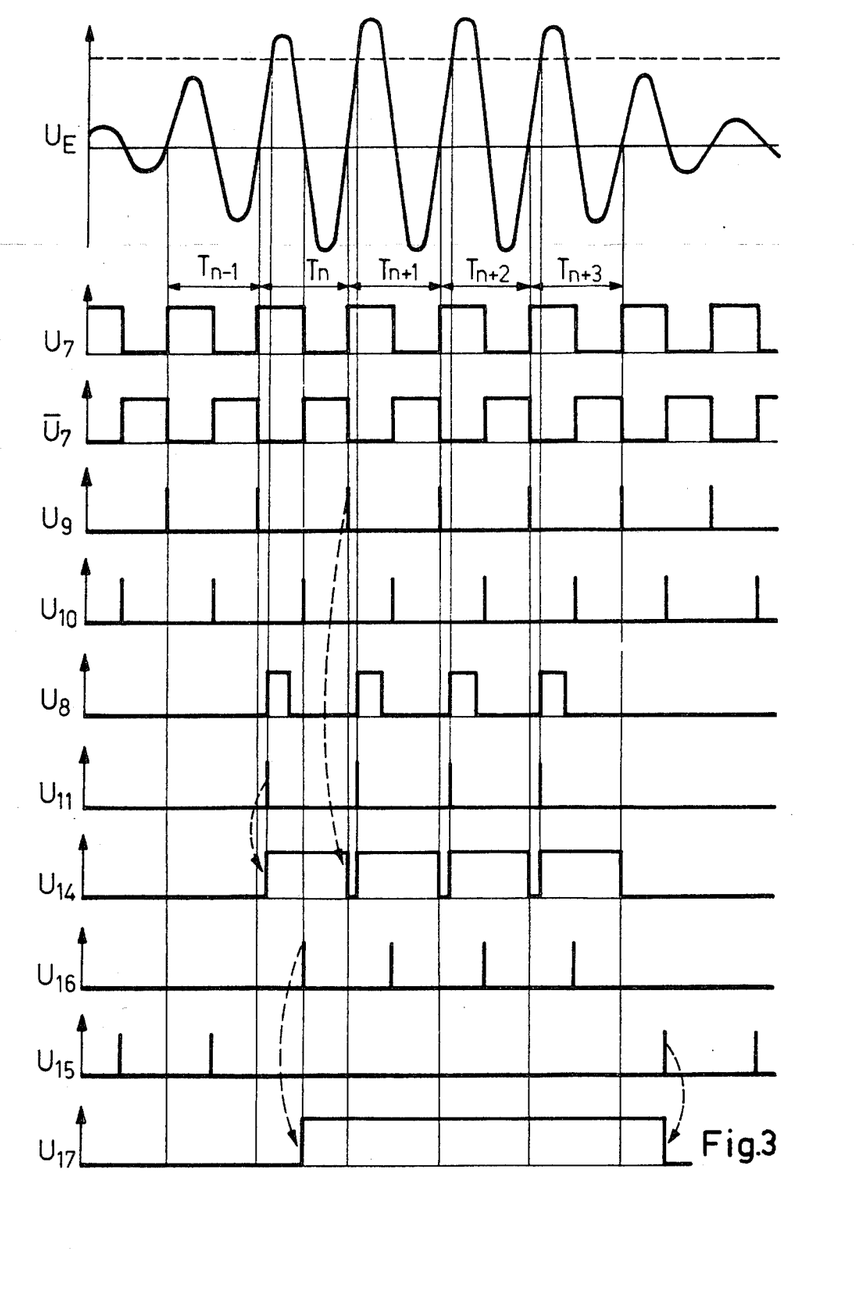
FIG. 3 is a pulse time diagram for explaining the operation of the circuit arrangement according to FIG. 2.

As seen in FIG. 3, the input signal $U_E$ completes its first cycle or period $T_n$ as it passes through zero. However, according to the invention no $U_{16}$ signal is produced at this time since the input signal did not exceed a predetermined level during the half period just preceeding said zero passage. The next $U_{16}$ signal is produced as the input signal passes again through zero from the positive half wave of the cycle $T_n + 1$ to the negative half wave of the cycle $T_n + 1$. However, when the input signal passes from the first cycle $T_n$ to the second cycle $T_n + 1$ the pulse $U_9$ resets the flip-flop 14 into its starting position. Thus, the same conditions are established for the next cycle $T_n + 1$ and the next $U_{16}$ time marker signal is produced in accordance with the invention when the second cycle $T_n + 1$ passes through zero subsequent to the fact that the just preceeding half wave has exceeded the threshold level. The just described signal processing is repreated as the input signal $U_E$ exceeds said predetermined threshold level again.

The last pulse $U_{11}$ of a train or series of pulses which also occurs only if the input signal exceeds the threshold level $U_0$ sets the flip-flop 14 to its set condition or state and as a result the last pulse $U_{16}$ of that series appears at the output $A_{16}$ of the AND-gate 16. Thereafter the flip-flop 14 is reset to its initial state by the pulse $U_9$. Since no further pulses $U_{11}$ are following, the AND condition is fulfilled at the AND gate 15. Accordingly the pulse $U_{10}$ passes through the AND-gate 15 and appears at the output $A_{15}$ as the pulse $U_{15}$ which resets the flip-flop 17 to its initial rest position and which appears at the $U_{17}$ output terminal of the circuit of FIG. 2.

The pulses $U_{16}$ and $U_{17}$ appearing at the respective output terminals of FIG. 2 carry the desired information. The number of pulses $U_{16}$ indicates how many cycles of the input signal $U_E$ have exceeded the threshold level $U_0$, whereas the duration of the $U_{17}$ pulses corresponds to the total duration of said number of cycles or periods. In addition, the position of the pulses $U_{16}$ and the trailing edge of the pulse $U_{17}$ define the duration of the individual cycles.

In order to indicate the cycle duration or frequency, it is necessary to further evaluate the pulses $U_{16}$ and $U_{17}$. This may be accomplished for example with the aid of a cycle duration and frequency measuring arrangement as illustrated in FIG. 4. This circuit arrangement is capable of measuring frequencies in real-time. Its individual components such as AND-gates, toggle flip-flops and the like are known as such and their internal details are thus not described.

The pulse train comprising the pulses $U_{16}$ and the pulse $U_{17}$ appearing at the output of FIG. 2 serve as input signals for the pulse duration and frequency measuring circuit arrangement of FIG. 4. Thus, the pulses $U_{16}$ are supplied to a counting input terminal $E_4$ of a counter Z and the pulses $U_{17}$ are supplied to a control or auxiliary input terminal $E_H$ of the counter Z. The counter Z comprises two series connected toggle flip-flop stages 19 and 20. Such toggle flip-flops are bistable stages with symmetrical triggering and may be embodied for example by such shelf item as "Texas Instruments Sn 7470." The input of the first toggle flip-flop 19 serves as the input of the binary counter Z which has two outputs $A_{19}$ and $\bar{A}_{19}$. The output $A_{19}$ is connected to an input of the second toggle flip-flop stage 20 and further connected to an input $E_{21}$ of a first AND-gate 21. The output $\bar{A}_{19}$ is connected to the first input $E_{22}$ of the second AND-gate 22 and further connected to the first input $E_{23}$ of the third AND-gate 23. The output $A_{20}$ of the second toggle flip-flop stage 20 is connected to the second input $\bar{E}_{21}$ of the first AND-gate 21 and to the second input $\bar{E}_{22}$ of the second AND-gate 22. The second output $\bar{A}_{20}$ of the flip-flop 20 is connected to the second input $\bar{E}_{23}$ of the third AND-gate 23.

The logical AND-gates 21, 22 and 23 produce at their outputs the logical products of the signals applied to their respective inputs as indicated in FIG. 4 and will be described in more detail below. The product representing output signals are employed to control the operation of an integrating circuit I and the interconnection of the integrating circuit I with a sample-and-hold circuit H.

The integrating circuit I comprises substantially an operational amplifier 24 the output of which is connected to its inverting input and the noninverting input of which is connected on the one hand to a capacitor $C_1$ connected to ground and on the other hand through a switch $S_3$ to a constant current source 25. The switch 3 is responsive in its operation to the output signal of the AND gate 21. A further switch $S_5$ which is responsive in its operation to the output signal of the AND gate 23 short circuits the capacitor $C_1$ to ground. The output of the integrator I is connected through a further switch $S_4$ to the input of a sample-and-hold circuit H whereby the switch $S_4$ is responsive in its operation to the output of the AND-gate 22. The sample-and-hold circuit H has somewhat similar features as the integrator I in that it comprises an operational amplifier 26 the output of which is connected to its inverting input and the noninverting input of which is connected through capacitor $C_2$ to ground and directly to said switch $S_4$.

At the output of the sample-and-hold circuit there is produced a signal $U_T$ which is directly proportional to the cycle duration. However, in order to indicate frequencies directly the signal $U_T$ is supplied to the input of a computing circuit R comprising a logarithmic amplifier 27, an adder 28, and an antilog circuit 29 at the output of which the frequency proportional signal $U_f$ is produced. The logarithmic amplifier 27 converts the signal $U_T$ into a signal $U_L$ which is equal to log $U_T$ ($U_L$ = log $U_T$). This signal is also inverted in the amplifier 27 to $-U_L$ and appears at its output as the signal $U_C$ (FIG. 4). This signal ($U_C = -$ log $U_T$) and a constant voltage $U_k$ equal to log$k$ ($U_k =$ log$k$) are supplied to the adder 28 which forms the signal $U_k - U_L =$ log$k -$ log $U_T$ and supplies it to the antilog circuit 29 at the output of which there appears a signal voltage $U_f$ which is inversely proportional to the output voltage $U_T$ of the sample-and-hold circuit H whereby the proportionality factor is $k$. A circuit arrangement which may embody the computing circuit R for transforming an input quantity into its reciprocal output value is embodied for example by "Philbrick Nexus log-modulus 4350 or 4351."

Figure 5:
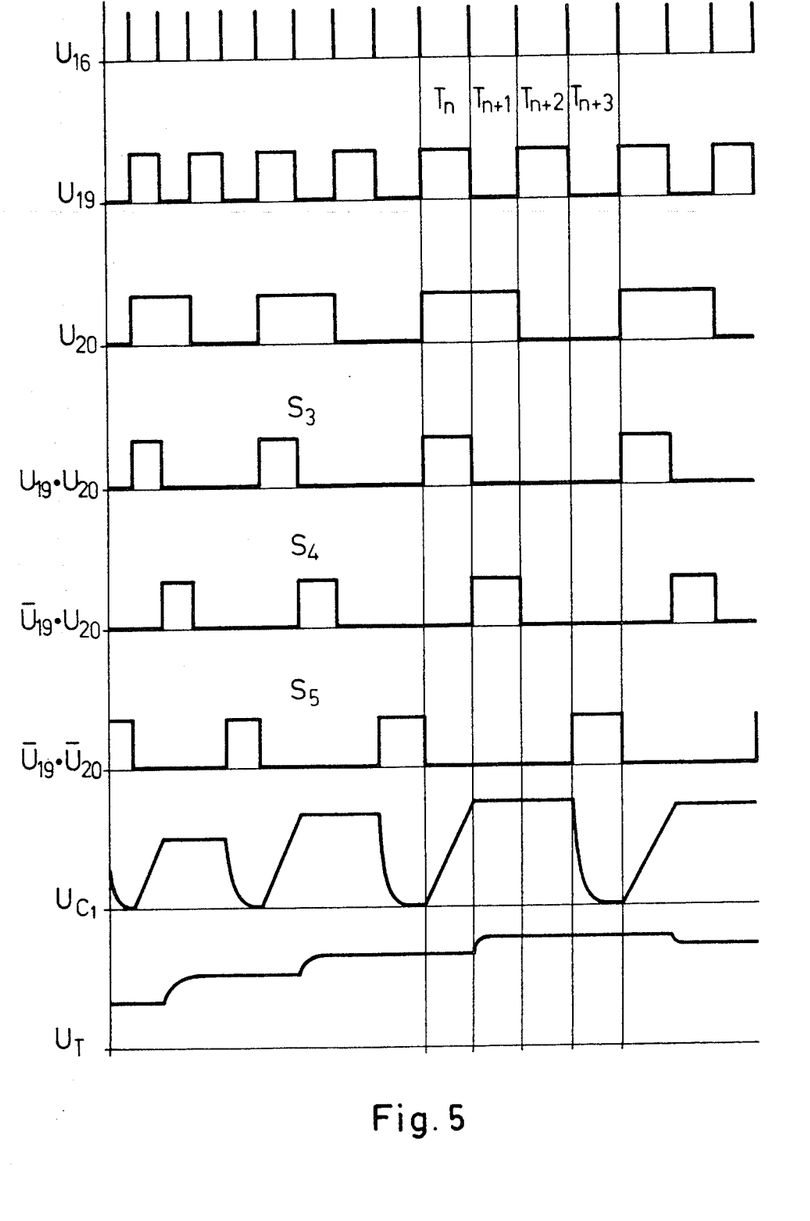
FIG. 5 is a pulse time diagram for explaining the operation of the circuit arrangement according to FIG. 4.

The operation of the circuit arrangement according to FIG. 4 will now be explained with reference to the pulse-time diagram of FIG. 5. The switch $S_3$ is closed during the cycle $T_n$. The capacitor $C_1$ is thus charged through the constant current source 25 to a voltage $U_{C1}$ which is proportional to the cycle or period duration of $T_n$. During the next period $T_{n+1}$ the switch $S_4$ closes whereby the output voltage of the integrator circuit I is supplied to the input of the sample-and-hold circuit H. The capacitor $C_1$ must now be discharged. However, this must take place only after the switch $S_4$ has opened again. In order to prevent obtaining erronious measurements due to the unavoidable switching uncertainty between the closing of the switch $S_5$ and the opening of the switch $S_4$, the cycle $T_{n+2}$ serves as a waiting interval in order to avoid passing a lower voltage to the sample-and-hold circuit H which would happen if the two switches $S_4$ and $S_5$ were closed simultaneously because then the capacitor $C_1$ would start to discharge while the switch $S_4$ is still closed. During the cycle $T_{n+3}$ which follows the cycle $T_{n+2}$ the switch $S_5$ closes and discharges the capacitor $C_1$ of the integrator I whereby the latter is reset to zero. In the next cycle the switch $S_3$ is closed again and the just described sequence is repeated whereby always a waiting period is inserted between the signal transfer and the discharge of the capacitor $C_1$. In this manner the period duration proportional signal $U_T$ is produced at the output of the sample and hold circuit H which is then converted as described above into an output signal $U_f$ which is proportional to the frequency of the time marker signal $U_{16}$.

The measuring cycles are controlled by the time marker signals $U_{16}$ so that the processing of the measured value and the signal to be measured are shychronious to each other. The control of the measuring cycles, that is the operation of the switches $S_3$, $S_4$ and $S_5$ is accomplished by the above described logic circuit arrangement comprising the AND-gates 21, 22, and 23. This logic circuit arrangement will now be described in somewhat more detail.

It is assumed that the two toggle flip-flop stages 19 and 20 are in their rest position. If now the pulse $U_{16}$ is applied to the input of the first toggle stage 19 its output $A_{19}$ will produce the logic state 1. As a result, the output $A_{20}$ of the second toggle flip-flop stage 20 will also assume the logic state 1. The respective outputs $\bar{A}_{19}$ and $\bar{A}_{20}$, both present at this time the logic 0 state. The next positive edge or flank of the signal $U_{16}$ changes the output state so that the logic state 0 appears at the output $A_{19}$ and the logic state 1 appears at the output $\bar{A}_{19}$. Since the second toggle flip-flop 20 changes its output state only in response to positive pulse edges, just as the first toggle flip-flop 19, the state at the output of the second toggle flip-flop 20 remains when the first toggle flip-flop 19 changes from logic 1 to logic 0. The state at the output of the second toggle flip-flop 20 changes only when at the beginning of the period $T_{n+2}$ there appears the next time marker signal whereby the output $A_{20}$ assumes the logic state 0 and the output $\bar{A}_{20}$ assumes the logic state 1. These relationships are shown in the pulse-time diagram of FIG. 5. It will be noted that the pulse train $U_{19}$ has a frequency corresponding to one half of the frequency of the time marker signals $U_{16}$ whereas the pulse train $U_{20}$ has a frequency corresponding to one fourth of the time marker signal frequency. All three pulse trains are in phase with each other after four cycles of the $U_{16}$ signals, for example at the beginning of the cycle $T_n$, $T_{n+4}$, $T_{n+8}$, and so forth.

As described above, the outputs of the toggle flip-flops 19 and 20 are connected to the three AND gates 21, 22, and 23. Accordingly, the first AND-gate 21 receives the pulse trains $U_{19}$ and $U_{20}$, the second AND-gate 22 receives the pulse trains $\bar{U}_{19}$ and $U_{20}$, whereas the third AND-gate receives the pulse trains $\bar{U}_{19}$ and $\bar{U}_{20}$. These AND-gates produce at their outputs in a manner known per se the logic products or AND combinations of the voltages applied to their respective two inputs. Accordingly, at the output of the first AND-gate 21 there appears the pulse train $U_{19} \times U_{20}$, at the output of the second AND-gate 22 there appears the pulse train $\bar{U}_{19} \times U_{20}$ and at the output of the third AND-gate 23 there appears the pulse train $\bar{U}_{19} \times \bar{U}_{20}$. These pulse trains are shown in FIG. 5.

The pulse train $U_{19} \times U_{20}$ is a sequence of rectangular voltages having a pulse width corresponding to the cycle duration $T_n$ which voltages are in phase with the period $T_n$. The pulse train $\bar{U}_{19} \times U_{20}$ has a pulse width corresponding to that of the period duration $T_{n+1}$ and is in phase with this period. The pulse train $\bar{U}_{19} \times \bar{U}_{20}$ has the pulse width corresponding to the period duration $T_{n+2}$ and is in phase with the period $T_{n+2}$.

The control function for controlling the measuring cycles is obtained as described above in response to the time marker signal $U_{16}$. Those skilled in the art will appreciate that in the described circuits the switches such as $S_1$ to $S_5$ are not mechanical switches but rather electronic switching elements such as bipolar transistors or field effect transistors. Merely for the sake of clarity, simple switching symbols have been employed.

In order to avoid measuring errors which, for example may occur if the time marker signal does not appear continuously, it is necessary to stop a measuring cycle at a suitable point of time. Such stopping must be accomplished by the signal to be measured. Accordingly, the control signal $U_{17}$ is derived in the circuit arrangement according to FIG. 2 and supplied to the input $E_H$ of the counter Z in FIG. 4.

As explained above the output $A_{17}$ of the flip-flop 17 is set to provide an output signal as long as the input signal $U_E$ exceeds the threshold level $U_0$ in the preceeding period or cycle. The flip-flop 17 is reset to its initial or rest position when this condition is no longer fulfilled. As a result, the counter Z is reset to zero. This in turn produces the logical produce $\bar{U}_{19} \times \bar{U}_{20}$ at the output of the AND-gate 23 whereby the switch 5 is closed and the capacitors $C_1$ discharged. The switches $S_3$ and $S_4$ are simultaneously opened. Therefore, neither the capacitor $C_1$ can be charged nor is it possible to pass on to the sample and hold circuit H an integrator voltage $U_{C1}$. This feature of the invention has the advantage that it excludes erronious measurements when the input signal is absent. Moreover, this feature is necessary for measuring the cycle duration or frequency of electrical signals which have statistically varying amplitudes whereby only those signals are to be included in the measuring cycle whose amplitudes exceed a definite level.

As described above, the measuring circuits according to the invention are especially suitable for use in connection with Radar-Doppler systems. Assuming a constant flow velocity, the Doppler signal is an alternating voltage the amplitude of which varies at random. In the focusing volume the intensity of the light drops sharply from the center outwards. As a result the Doppler signals scattered by the particles passing through the focusing volume have larger or smaller amplitudes depending upon whether the scattering particle passes closer to the center or closer to the peripheral zone of the measuring volume.

Another course for the random variations of the Doppler signal amplitudes is seen in the fact that the scattering particles themselves move at random through the measuring volume.

The first mentioned effect, namely that the light intensity decreases from the center outwardly of the measuring volume may now be used to reduce by electronic means the measuring volume which otherwise would be determined by the focusing volume of the laser light. This is accomplished according to the invention by evaluating only those Doppler signals which have an amplitude exceeding a predetermined threshold level. The circuit arrangements described above with reference to FIGS. 1, 2, and 4 are especially suitable for this purpose as will now be described with reference to FIG. 6.

Figure 6:
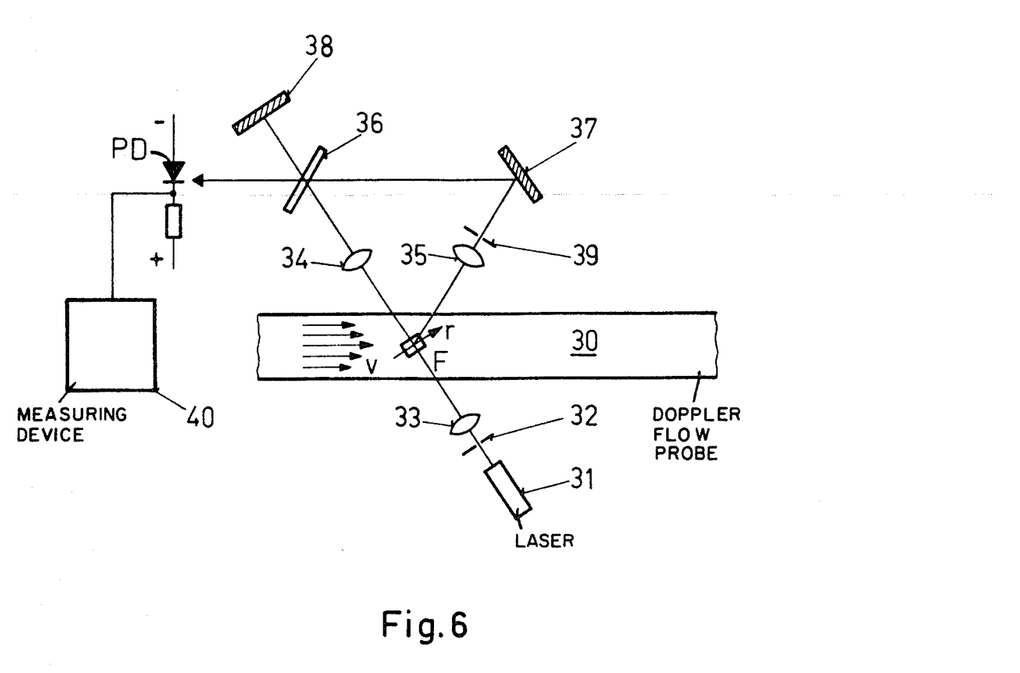
FIG. 6 is an embodiment according to the invention for measuring the Doppler frequencies of a Laser-Doppler flow probe.

FIG. 6 illustrates a Doppler flow probe 30 through which a medium flows in the direction $v$. The medium is illuminated by the light of a continuous wave laser 31. A diaphragm 32 limits the laser beam and a lens 33 focuses the laser beam onto the volume F within the medium, for example, a liquid. The volume F extends perpendicularly to the direction of the laser beam as indicated by the arrow $r$. A partial beam passes unscattered through the volume F and is focused by the lens 34. A scattered partial beam passes from the volume F to the lens 35. The lenses 34 and 35 focus the partial beams onto reflecting mirrors 38 and 37 respectively whereby the partial beams are directed through a divider 36 onto a detecting means comprising a photo diode PD. A diaphragm 39 may be provided for limiting the scattered partial beam.

Figure 1:
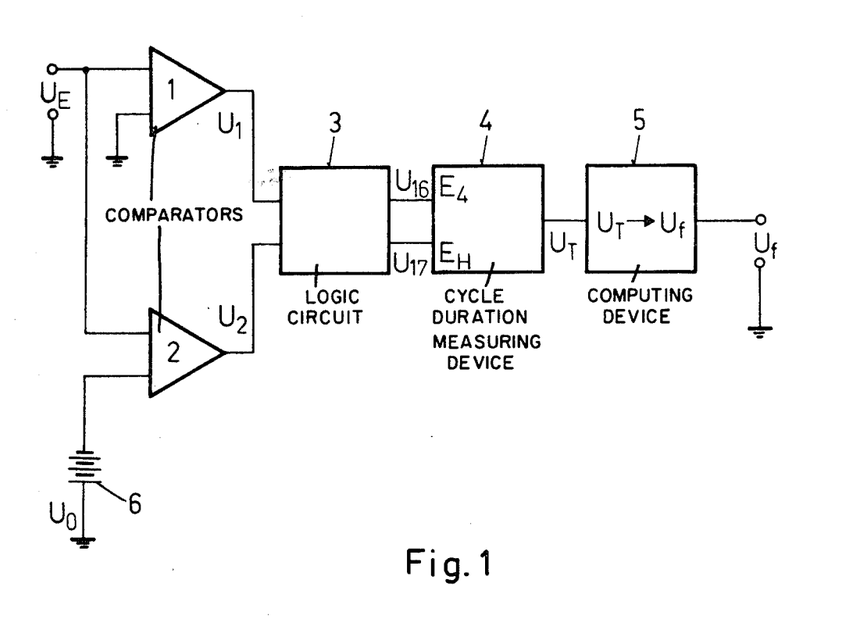
FIG. 1 shows a block circuit diagram of an apparatus of the invention suitable for performing the present method.

The photo diode PD produces a Doppler signal $U_E$ which is used as the input signal for the circuit arrangements shown in FIG. 1 or in FIGS. 2 and 4. These circuit arrangements are indicated by the block 40 in FIG. 6.

Figure 7:
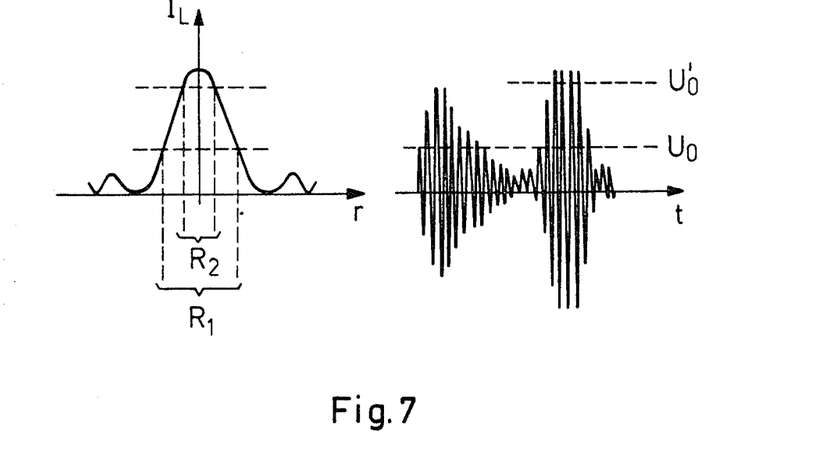
FIG. 7 illustrates the wave forms suitable for explaining the operation of the apparatus according to FIG. 6.

Referring to FIG. 7 the operation of FIG. 6 will now be explained. The wave form shown on the left side of FIG. 7 illustrates diagrammatically the intensity of the light in the focal plane of the focusing volume F. It will be noted that the intensity drops sharply with increasing distance $r$ from the center of the focusing volume. The right hand part of FIG. 7 illustrates that the heterodyne signals appearing at the output of the photo diode PD in FIG. 6 have amplitudes which are the larger, the smaller the distance $r$ of the scattering particle from the center of the focusing volume. The passage of the scattering particles through the focusing volume is at random. Therefore, FIG. 7 shows that the amplitude distribution as a function of time is also at random. Incidentally, the right hand part of FIG. 7 has been drawn from the picture on an oscillograph screen. It will be noted that the frequencies of the signals having smaller amplitudes differ from the frequencies of the signals having large amplitudes. This is due to the fact that the scattering particles at large distances R from the center of the focusing volume have another velocity than in the center of said volume at the time when the measuring takes place.

If now the threshold level $U'_0$ is adjusted as taught by the invention, only the signals will be measured in the frequency measuring device 40 which were produced by particles having passed through the central region of the focusing volume approximately having an extension $R_2$ as indicated in FIG. 7. Accordingly, the central region constitutes the effective measuring volume. On the other hand, if the threshold level is adjusted to $U_0$, signals will also be measured which have been caused by particles passing through the focusing volume in the range $R_1$. In both instances, the measuring volume will be made smaller than the focusing volume F by the electronic amplitude discrimination as taught by this invention.

In order to ascertain rapidly and exactly mean values of cycle durations or frequencies over several periods of the input signal, a presettable counter 18 is provided which is set to a zero count at the beginning of the measuring cycle whereby the switch $S_2$ is in the "preset" position. As long as the starting switch $S_1$ is closed, the output $A_{18}$ of the counter 18 remains set and thus makes it possible for the pulses $U_{11}$ to pass the AND-gate 12. However, upon reaching the preselected number of cycles the counter 18 blocks the AND-gate 12 by removing the AND condition from one of its inputs. Accordingly, the sum of the duration of all the pulses $U_{17}$ corresponds to the total duration of the preselected number of cycles or periods of the input signal $U_E$ having a signal amplitude larger than the threshold level $U_0$ to which the comparator 2 has been adjusted.

There are two possibilities of further processing the signals derived according to the invention. They may either be processed in a digital manner whereby the total duration of the pulses $U_{17}$ is summed in a summing counter and the result is divided by the number of time marker pulses $U_{16}$. Analog processing is also possible whereby the pulses $U_{17}$ are fed to an integrator which is charged for the duration of the $U_{17}$ pulses. The resulting integrator voltage is directly proportional to the pulse duration, and is then divided by the number of time marker pulses $U_{16}$.

In view of the foregoing it will be appreciated that, although the invention has been described with reference to particular examples, it is intended to cover all modifications and equivalents within the scope of the appended claims.

What is claimed is:

1. A method for measuring the period of an electrical signal having statistically fluctuating amplitudes which exceed a definite, adjustable level, comprising the steps of deriving a time marker signal from said input signal when the input signal passes through zero and in response to the fact that said input signal has exceeded said definite, adjustable level in the half-period preceeding said zero passage for indicating the number of periods which have exceeded said level, further deriving a control signal from said input signal for indicating the total duration of all periods which have exceeded said definite, adjustable level, and ascertaining the cycle duration of said input signal by combining said derived signals.

2. The method according to claim 1, wherein for said ascertaining, the time marker signal is fed to period measuring means and wherein said control signal is supplied to a control input of said measuring means for starting a count and for resetting a counter to zero in response to its logic level.

3. The method according to claim 1, further comprising adjusting a presettable counter to a predetermined count of input signal periods, which have exceeded said definite, adjustable level, and ascertaining from said control signal with the aid of said time marker signal the mean cycle duration of said preset number of input signal periods, which have exceeded said definite, adjustable level.

4. The method according to claim 1, further comprising evaluating, as said input signal, the Doppler signal of a Laser-Doppler flow probe and ascertaining with said evaluating the cycle duration of those signals the amplitudes of which exceed said determined adjustable level.

5. The method according to claim 1, wherein said derived signals are produced as digital signals, said method further comprising summing said digital control signals for producing the total duration of said control signals, counting the digital time marker signals and dividing said total duration by the number of said digital time marker signals.

6. The method according to claim 1, wherein said derived signals are produced as analog signals, said method further comprising integrating said analog control signals, counting said time marker signals, and dividing the integration result by the number of said time marker signals.

7. An apparatus for measuring the cycle duration of an electrical input signal having statistically fluctuating amplitudes which exceed a definite, adjustable level, comprising first circuit means responsive to said input signal for deriving a time marker signal from said input signal when the latter passes through zero and if said input signal has exceeded said definite, adjustable level during a half cycle preceeding said passage through zero, and second circuit means also responsive to said input signal for deriving a control signal from said input signal, whereby said time marker signal indicates the number of periods during which the input signal has exceeded said level while the control signal indicates the total duration of said number of periods, and measuring means connected to said first and second circuit means for ascertaining said cycle duration from said time marker signal to said control signal.

8. The apparatus according to claim 7, wherein said cycle duration measuring means include a counter having a control input and means for supplying said control signal to said counter control input for starting the counter and resetting the counter to zero in response to the respective logical level of said control signals.

9. The apparatus according to claim 7, further comprising a presettable counter and logic circuit means for interconnecting said counter with said measuring means for ascertaining the mean cycle duration of said preset count of input cycle periods.

10. The apparatus according to claim 7, wherein said first circuit means comprise a first comparator means having an output, an input connected to receive said electrical input signal and a comparing input connected to ground, a first Schmitt-trigger connected to said first comparator output and having first and second outputs, first and second mono-stable multivibrator means connected respectively to said first and second outputs of the first Schmitt-trigger, a first set-reset flip-flop connected with its reset input to an output of said first mono-stable multivibrator, a first AND-gate having one input connected to a first output of said first set-reset flip-flop, a second AND-gate having one input connected to a second output of said first flip-flop, means for connecting second inputs of said first and second AND-gates in parallel to each other and to an output of said second mono-stable multivibrator, a second set-reset flip-flop having its set input connected to an output of said first AND-gate and its reset input connected to an output of the second AND gate; and wherein said second circuit means comprise second comparator means, an adjustable voltage source connected to a comparing input of said second comparator means, means for connecting another input of said second comparator means to receive said electrical input signal, a third mono-stable multivibrator, a second Schmitt trigger interconnected between an output of said second comparator and an input of said third monostable multivibrator, a third AND-gate, means for connecting a first input of said third AND-gate to an output of the third mono-stable multivibrator, a further voltage source, means for connecting two other inputs of the third AND-gate in parallel to said further voltage source, and means for connecting an output of the third AND-gate to a set-input of the first set-reset flip-flop, and circuit means for connecting the output of said first AND-gate and an output of said second set-reset flip-flop to said measuring means.

11. The apparatus according to claim 10, further comprising starter switching means for connecting said further voltage source to a second input of said third AND-gate.

12. The apparatus according to claim 11, further comprising a presettable counter, means for connecting an input of said presettable counter to the output of said first AND-gate, further switching means for connecting an output of said presettable counter to a third input of said third AND gate and simultaneously disconnecting said third input of the third AND gate from said further voltage source.

13. The apparatus according to claim 7, wherein said measuring means comprise a binary counter connected to outputs of said first and second circuit means, an integrating circuit, and a sample-and-hold circuit, and logic circuit means for interconnecting said counter, the integrating circuit, and the sample-and-hold circuit for producing a cycle duration proportional signal.

14. The apparatus according to claim 13, for producing a frequency proportional signal, further comprising a computing circuit connected to the output of the sample and hold circuit for producing at the output of the computing circuit a frequency proportional signal.

15. The apparatus according to claim 13, wherein said binary counter comprises a first flip-flop stage having a counting input connected to an output of said first circuit means, a second flip-flop stage connected in series with the first stage, each stage having a control input connected in parallel to an output of said second circuit means, each stage further having first and second outputs; a first AND-gate connected with its inputs to the first outputs of both stages, a second AND-gate connected with one input to the second output of the first stage, and with another input to the first output of the second stage, a third AND-gate connected with its inputs to the second outputs of both stages, a constant current source, first switching means for connecting said constant current source to said integrating circuit in response to an output from the first AND-gate, second switching means for connecting said integrating circuit to said sample-and-hold circuit in response to an output from said second AND-gate, and third switching means for controlling said integrating circuit in response to an output from said third AND-gate.

16. The apparatus according to claim 15, wherein said integrating circuit comprises an operational amplifier, a capacitor connected to ground, to an input of said operational amplifier and through said first switching means to said constant current source, said capacitor being dischargeable to ground through said third switching means.

17. The apparatus according to claim 15, wherein said sample and hold circuit comprises an operational amplifier and a capacitor connected to one of its inputs and to said second switching means.

18. The apparatus according to claim 15, wherein said control input is a stop counting input for stopping the counting of both stages simultaneously.

19. The apparatus according to claim 7, further comprising means for producing said electrical input signal, said input signal producing means comprising a Doppler flow probe, means for producing a laser beam, means for directing said laser beam through said flow probe, photo detecting means, means for directing a partial beam passing directly through said flow probe as well as a deflected beam from said flow probe to said photo detecting means, and means for connecting an output of said photo detecting means to inputs of said first and second circuit means.

* * * * *